Dec. 17, 1968  J. E. WILCOCK  3,416,909
APPARATUS FOR MOULDING OF GLASS ARTICLES
Filed April 12, 1965  3 Sheets-Sheet 1

Inventor
John E. Wilcock
By
Morrison, Kennedy & Campbell
Attorneys

Dec. 17, 1968  J. E. WILCOCK  3,416,909
APPARATUS FOR MOULDING OF GLASS ARTICLES
Filed April 12, 1965  3 Sheets-Sheet 2

Inventor
John E. Wilcock
By
Morrison, Kennedy & Campbell
Attorneys

Dec. 17, 1968   J. E. WILCOCK   3,416,909
APPARATUS FOR MOULDING OF GLASS ARTICLES
Filed April 12, 1965   3 Sheets-Sheet 3

Inventor
John E. Wilcock
By
Morrison, Kennedy & Campbell
Attorneys

United States Patent Office 3,416,909
Patented Dec. 17, 1968

3,416,909
APPARATUS FOR MOULDING OF GLASS ARTICLES
John Edward Wilcock, St. Helens, England, assignor to Pilkington Brothers Limited, Liverpool, England, a corporation of Great Britain
Filed Apr. 12, 1965, Ser. No. 447,211
Claims priority, application Great Britain, Apr. 14, 1964, 15,426/64
4 Claims. (Cl. 65—309)

ABSTRACT OF THE DISCLOSURE

Apparatus for moulding glass articles using a mould and co-operating plunger actuated by a ram. The plunger is connected to the ram by an adaptor including two shoes having opposed flat parallel faces one shoe being connected to the ram and the other to the plunger, and a plurality of balls between said opposed faces to permit limited free sliding movement of the plunger axis in a direction transverse to the ram axis, whereby the plunger is self-aligning on entering a mould.

---

Figure 1:
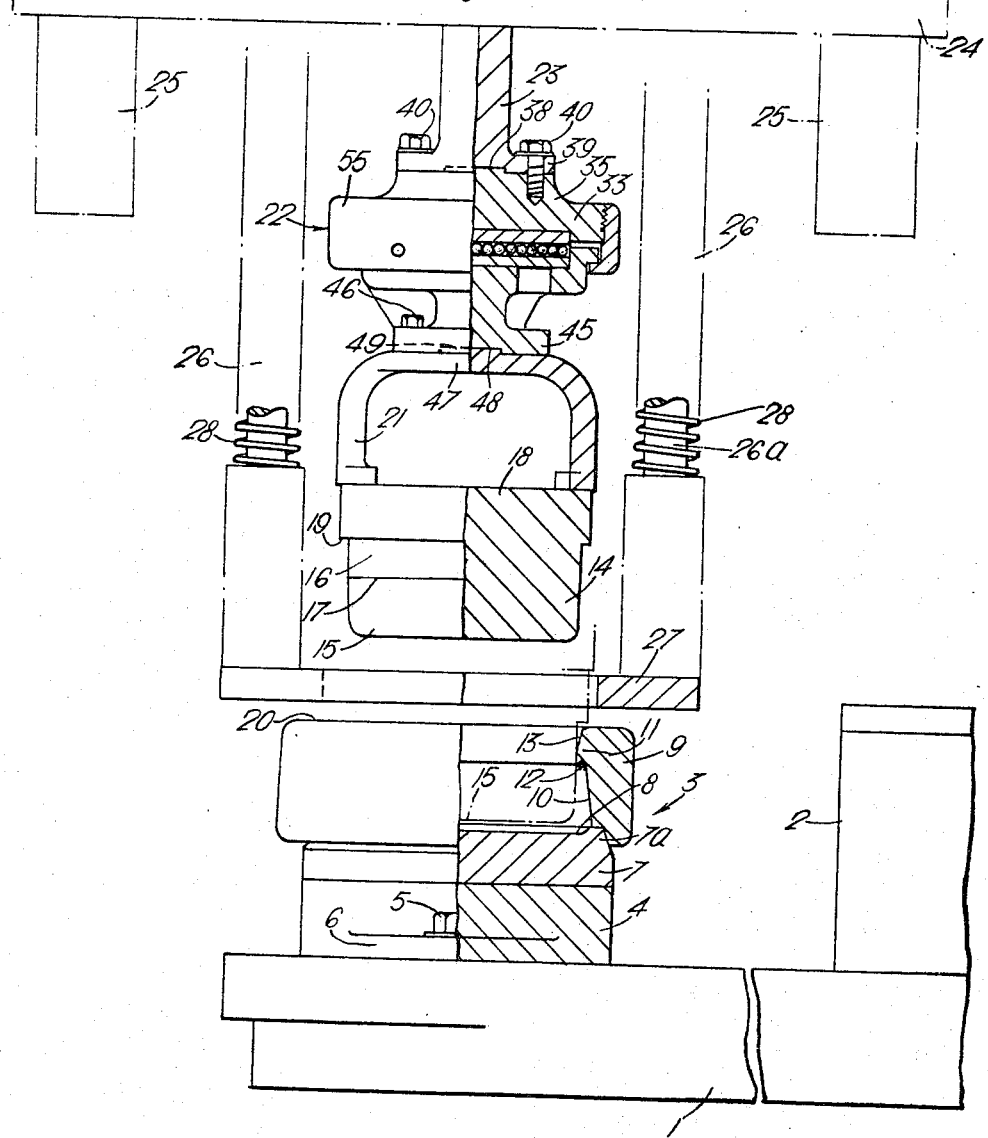

This invention relates to the moulding of glass articles, and in particular to an improved method and apparatus for moulding hollow glass articles, for example glass building blocks or insulators.

Apparatus for moulding glass articles usually comprises a hollow mould member and co-operating plunger which descends into the mould member after the mould member has received a charge of molten glass. A number of identical hollow mould members may be equispaced around the periphery of a circular table which is rotated so that the hollow mould members are presented in turn to a plunger at the moulding station.

Both the hollow mould member and the plunger must be accurately dimensioned in order to ensure that the moulded article has the correct dimensions and in apparatus for moulding glass articles on automatic machines it has been difficult to maintain the correct alignment of the plunger with each mould on the machine table. Correct alignment of the mould members is important in all moulding apparatus, but in particular in apparatus for moulding glass articles which have thin or irregular sections, and glass articles which are finned or fluted.

The plunger is usually attached rigidly to a ram and if the plunger is not correctly aligned with the hollow mould and its associated ring plate which are on the rotary table, then the plunger will be stressed while it is engaging the hollow mould, which may lead to damage to the mould parts and malformation of the moulded articles.

It has been found that correct alignment is necessary to within 2 or 3 thousandths of an inch and this is difficult to achieve more particularly in a large automatic moulding machine, since the machine is set up when all its parts are cold, but when the hollow moulds on the machine table, the plungers, and the rest of the machine are heated up during operation the alignment of the several hollow moulds on the table with the plunger can differ by appreciable amounts.

It is a main object of the present invention to provide an improved apparatus for moulding glass articles in which the alignment difficulties mentioned above are overcome.

According to the invention there is provided apparatus for moulding glass articles comprising a hollow mould and a co-operating plunger mounted on a ram which is operable to move the plunger into and out of the mould, wherein the plunger is connected to the ram by means permitting movement of the plunger transversely of the direction of movement of the ram to permit alignment of the plunger with the mould.

Preferably the plunger is connected to the ram by a self-aligning adaptor comprising flat parallel members mounted face-to-face and slidable relative to each other and respectively fixed to the ram and to the plunger.

In a preferred embodiment of the invention the adaptor comprises two flat parallel plates respectively mounted in seatings in upper and lower shoes which are respectively fixed to the ram and to the plunger, and a plurality of balls located between the opposed faces of said plates to facilitate relative movement between the plates while maintaining the parallel relationship of said faces.

Desirably the upper and lower shoes are of cylindrical form, the parallel plates are circular discs held in recessed seatings in the shoes, the lower shoe is formed with a peripheral flange having a lower flat abutment face, the outer surface of the upper shoe is threaded and a retaining ring having an inturned flange is screwed on to the upper shoe until the upper flat face of said inturned flange abuts against said lower abutment face on the lower shoe, the outer diameter of said peripheral flange being less than the inner diameter of the ring to permit the abutment face of the lower shoe to slide relative to the flat face of the inturned flange as the plunger aligns itself in the mould.

Although the invention may be applied to moulding operations in which the mould is held vertically and the plunger caused to move horizontally into the mould, one particular application of the invention is to an automatic moulding machine which includes means connected to the ram and operable to reciprocate the ram vertically, and a plurality of hollow moulds arranged to be consecutively presented to the plunger.

In such a machine the moulds are preferably equispaced around a circular table, and means connected to the table are provided to rotate the table stepwise to present the moulds in turn under the plunger.

The invention also comprehends a self-aligning adaptor for use in apparatus as set out above, and consisting of upper and lower shoes of cylindrical form respectively for fixing to the ram and the plunger, two flat parallel circular discs respectively held in recessed seatings in said shoes, a plurality of balls located between the opposed faces of the plates to facilitate relative movement between the plates while maintaining the parallel relationship of the faces, and wherein the lower shoe is formed with a peripheral flange having a lower flat abutment face, the outer surface of the upper shoe is threaded and a retaining ring having an inturned flange is screwed on to the upper shoe until the upper flat face of said inturned flange abuts against said lower abutment face on the lower shoe, the outer diameter of said peripheral flange being less than the inner diameter of the ring to permit the abutment face of the lower shoe to slide relative to the flat face of the inturned flange.

Figure 2:
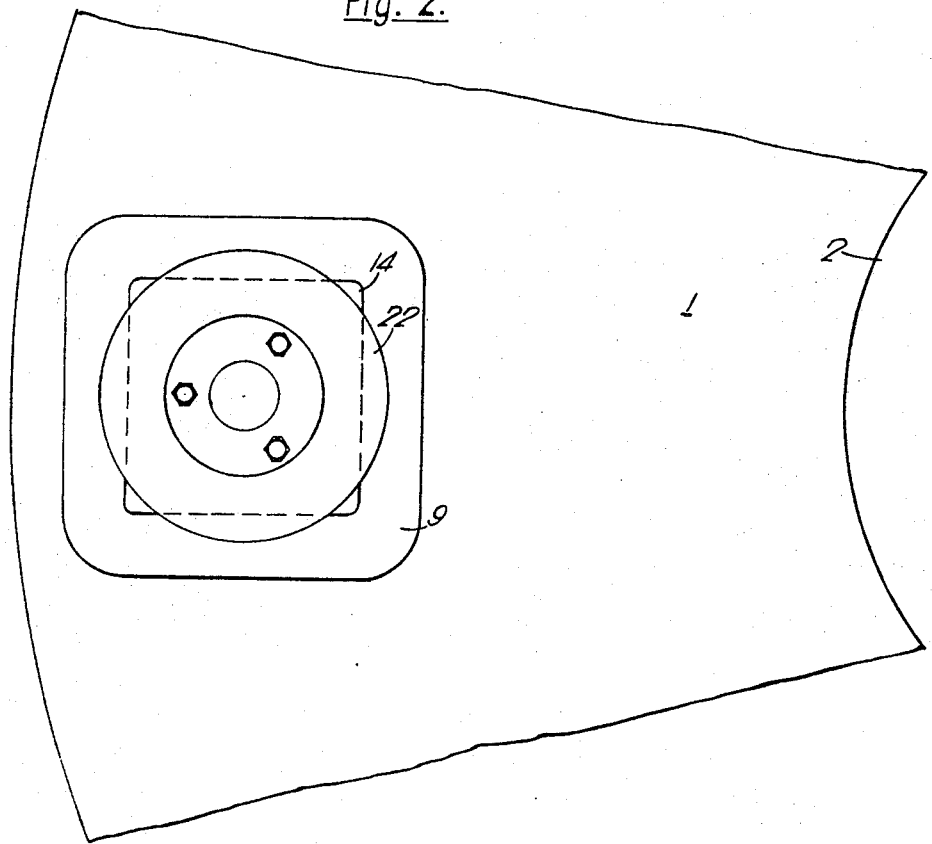
Figure 3:
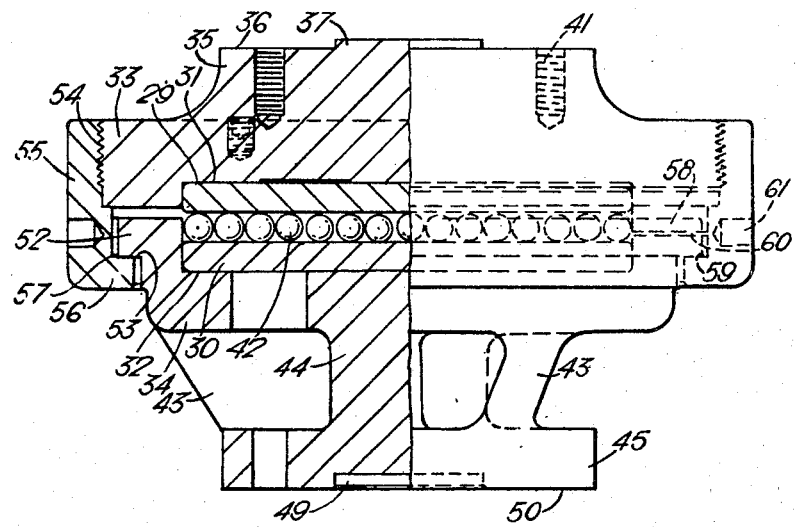
Figure 4:
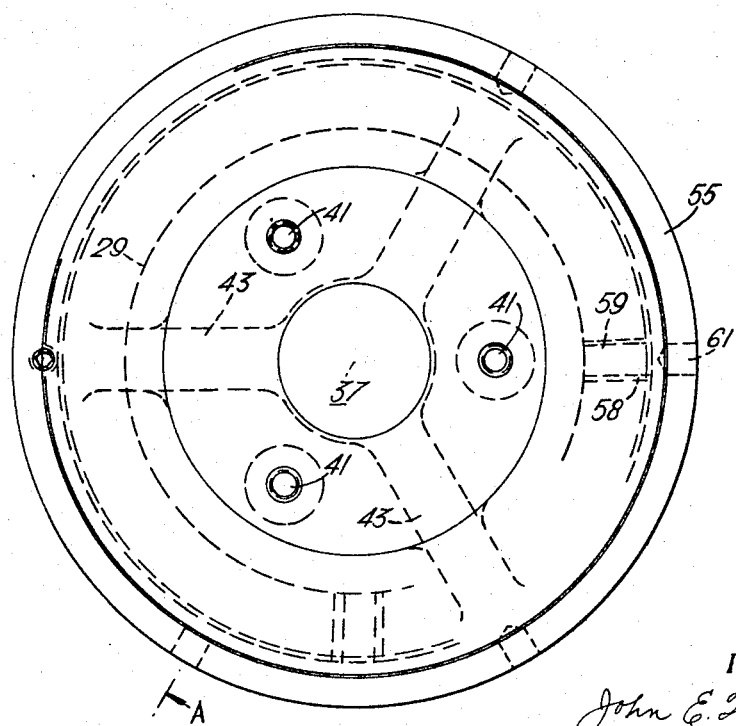

In order that the invention may be more clearly understood an embodiment thereof will now be described, by way of example, with reference to the accompanying drawings in which:

FIGURE 1 is an elevation, partly in section, of apparatus according to the invention for moulding hollow glass blocks on an automatic rotary moulding machine, FIGURE 2 is a plan view of the apparatus of FIGURE 1, FIGURE 3 is a part-sectional view of the self-aligning adaptor which is also shown in FIGURE 1, but illustrating the construction of the adaptor in greater detail, and FIGURE 4 is top plan view of the adaptor of FIGURE 3.

Referring first to FIGURES 1 and 2 of the drawings, these figures illustrate diagrammatically the application of the invention to an automatic moulding machine for moulding hollow glass blocks, which machine includes a rotary press table 1 which rotates in stepwise fashion about a central spindle 2. A plurality of hollow moulds indicated generally by the reference number 3, are equispaced around the margin of the press table 1 and are all at the same radial distance from the centre of the circular press table 1, and are equidistant from each other around the margin of the table. Each of the hollow moulds 3 includes a massive base 4 which is bolted to the table 1 by bolts, one of which is shown at 5, passing through the lug 6 on the side of the base 4. The bottom 7 of the hollow mould is brazed to the base 4 and the top surface of the part 7 is shaped as indicated at 8, to the desired forming surface for the face of the glass block. The outer edge of the mould bottom 7 is formed as a sloping shoulder 7a.

The mould 3 also includes a specially shaped side wall 9 of rectangular form which is seated on to the mould part 7. The inner bottom surface of the mould wall 9 is shaped to co-operate with and seat onto the shoulder 7a. The side wall 9 can be lifted off the mould base 7 to allow a moulded article to be removed. The inner surface 10 of the side wall 9 is shaped to the desired outer surface shape of the glass block and this special shaping of the side wall 9 includes the provision of an inturned flange 11 formed at the top of the side wall 9. The bottom surface of the flange 11 is cut away to the desired circular shape for forming the top edge of the side walls of the moulded glass block, as indicated at 12, and the inner face of the flange 11 slopes upwardly and outwardly as indicated at 13 to provide a lead-in surface for the plunger 14 when it descends into the mould 3.

The plunger 14 is of corresponding rectangular form as indicated in FIGURE 2, and the bottom part 15 of the outer surface of the plunger has the shape required for the internal surface of the moulded glass block. The part 15 of the plunger has a slight downward taper. The top part of the plunger surface 16 is of right rectangular form and is separated from the moulding surface 15 by a plane indicated at 17, which plane lies opposite the bottom edge of the inturned flange 11 on the mould sidewall 9 when the plunger is in its lowermost position in the mould 3 as indicated by dotted lines at the right-hand side of FIGURE 1. The top part 18 of the plunger 14 is of wider dimensions than the shaping surface 15 so that there is a shoulder 19 around the plunger at the top of the surface 16, which shoulder 19 abuts against the top edge 20 of the mould side wall 9 to limit the downward movement of the plunger 14 in the mould 3 and so ensure that the bottom surface of the plunger 14 is stopped when it reaches the correct moulding position in the mould 3.

A supporting bridge 21 is welded to the top part 18 of the plunger, and this bridge 21 is connected to a self-aligning adaptor according to the invention which will be described in greater detail below. This self-aligning adaptor, which is indicated in FIGURE 1 by the general reference 22, connects the plunger 14 to a ram 23 which is itself connected to a piston (not shown) slidably mounted in a cylinder on a crosshead 24 mounted above the moulding station of the machine on stanchions 25.

Also mounted through the crosshead there are hollow struts 26 which extend downwardly from the crosshead in which struts 26 supporting rods 26a are slidably mounted. The rods 26a support a ring pressure plate 27 which engages with the top surface 20 of the mould 3 in well-known manner before the plunger 14 enters the mould 3 through the ring plate 27. The ring plate is held against the mould by springs which are indicated at 28.

The self-aligning adaptor 22 is illustrated in detail in FIGURES 3 and 4 and permits movement of the plunger 14 transversely to the direction of movement of the ram 23 so that the plunger can align itself with the mould 3 as it enters the mould through the ring plate 27 and flange 11 of side wall 9. In the illustrated embodiment of the invention the ram 23 is reciprocated vertically through the crosshead 24 and the adaptor 22 allows a slight horizontal movement of the plunger 14 to give the required alignment.

The adaptor 22 comprises two flat parallel members which are mounted face-to-face and are slidable relatively to each other and are respectively fixed to the ram 23 and the plunger 14. These two flat parallel members are constituted by flat parallel plates 29 and 30 which are respectively mounted in seatings 31 and 32 formed in upper and lower shoes 33 and 34. The shoe 33 is of cylindrical form and is formed with a boss 36 which is accurately machined to be parallel with the face of the plate 29 seated in the shoe 33, and there is a central stub 37 upstanding from this surface 36 to fit into a corresponding recess 38 formed in the bottom surface of the ram 23 (see FIGURE 1). The bottom of the ram 23 is formed as a cylindrical flange 39 having the same diameter as the surface 36 of the boss 35 on the shoe 33, and bolts 40 are screwed through holes in the flange 39 into threaded holes 41 formed in the shoe 33.

The two flat parallel plates 29 and 30 are circular discs and are made of hardened steel and are separated by a plurality of hardened steel balls 42 which form a bearing between the two plates 29, 30. The shoe 34 in which the lower plate 30 is seated is connected by struts 43 and a central column 44 to a backing plate 45 to which the plunger 14 is fixed by bolts 46 passing through holes in the plate 45 into threaded holes (not shown) in the top span 47 of the bridge 21. To ensure correct positioning of the plunger relative to the adaptor the top surface of the span 47 is formed with a central stub 48 which fits into a corresponding recess 49 formed in the lower surface 50 of the plate 45. The lower face 50 of the plate 45 is parallel with the faces of the two hardened steel discs 29 and 30 and the top surface 36 of the boss 35 which forms part of the shoe 33 in which the plate 29 is seated.

The lower shoe 34 is formed with a peripheral flange 52 which has a lower flat abutment face 53 of annular form. The outer surface of the upper shoe 33 is threaded as shown at 54 and a retaining ring 55, which has an inturned annular flange 56, is screwed on to the thread 54 on the shoe 33 until the upper flat face 57 of the flange 56 on the ring 55 abuts against the lower abutment face 53 on the flange 52 on the shoe 34.

Each of the shoes 33 and 34 is formed with a keyway respectively 58 and 59 and a key 60 is held in the two co-operating keyways 58 and 59 by a grub screw 61 to resist relative rotation between the plates 29 and 30.

The ring 55 is not screwed up so tightly that there can be no relative movement between the two plates 29 and 30, but rather sufficient clearance is left, of the order of two ten-thousandths of an inch, to allow the lower shoe 34 to move transversely within the limits of the difference between the outer diameter of the lower shoe 34 and the inner diameter of the ring 55. As is clearly seen in FIGURE 3 the outer diameter of the flange 52 is less than the inner diameter of the ring 55 so that the plate 30 can slide to and fro relative to the plate 29, undue rotation being prevented by the key 60 in the keyways 58 and 59.

For example in one embodiment there is a difference of 3/16 inch between the outer diameter of the flange 52 and the inner diameter of the ring 55 so that there can be a transverse movement of the plunger 14 of up to 3/32 inch away from the central position of the plunger 14 and ram 23.

This wide range of movement of the plunger 14 transversely to the direction of movement of the ram enables the plunger to set itself to individual moulds without stress being imposed upon the plunger or the machine parts to which the plunger is attached. That is, if the plunger 14 is not in perfect alignment with the moulds 3 as they are presented to it, then as the plunger descends the lower corners of the plunger engage against the sloping surface 13 on the flange 11 at the top of the mould and the plunger is able to slide transversely by relative movement between the plates 29 and 30, without any strains being imposed, to take up a correctly aligned position as the plunger continues to descend and enters the mould 3. The plunger is thus free from any stress tending to cause it to move horizontally as it engages the molten glass in the mould and on disengagement of the plunger from the moulded glass block the plunger can lift vertically out of the mould without any tendency to deform or crack the glass block.

Any other glass moulding apparatus of the kind employing a hollow mould and a co-operating plunger can be provided with an adaptor as described above, for example for the moulding of glassware, glass insulators, or lens blanks. It has been found that by the use of the apparatus of the invention surface defects and cracking faults in the glass articles are reduced and there is less damage to plungers and to ring plates and other parts of the lower mould which could otherwise be damaged, for example by being scored by the plunger if it engages the mould incorrectly and is stressed during its movement into and out of the mould.

In some automatic moulding processes for moulding articles of complicated shape there is a first moulding station at which the article is partially formed, before being indexed to the final moulding station. The preforming plunger may also be mounted on a self-aligning adaptor according to the invention.

Apparatus according to the invention may also be employed in the moulding of articles from other mouldable materials, for example plastics, porcelain and other clay-like materials, and in the stamping of metal articles.

The invention thus provides apparatus which can be employed for any moulding operation in order to avoid any danger of the plunger being stressed due to misalignment with the mould. This is particularly important in the moulding of glass articles since the moulding operation is carried out on hot glass which enters the hollow mould at a temperature of about 900° C. so that misalignment between plungers and moulds on an automatic moulding machine which cannot be avoided due to temperature inequalities in different parts of the machine are compensated for by the adaptor which permits the plunger to set itself to the individual moulds as they are presented to the plunger without stress being imposed.

I claim:
1. Apparatus for moulding glass articles, comprising a hollow mould and a co-operating plunger mounted on a ram which is operable to move the plunger into and out of the mould, wherein the plunger is connected to the ram by means which comprises two flat members slidable relative to each other which as the plunger enters the mould permits a free sliding movement of the plunger so that its longitudinal axis moves transversely of the direction of movement of the ram to permit axial alignment of the plunger with the mould, said flat members being mounted in a seating in upper and lower shoes which are interconnected and respectively fixed to the ram and to the plunger and one of which is mounted to move relative to the other in a lateral adjustment thereof, and a plurality of anti-friction bearing located between the opposed faces of said flat members to facilitate said transverse movement between the flat members while maintaining the parallel relationship of said faces.

2. Apparatus according to claim 1, wherein the upper and lower shoes are of cylindrical form, the opposed flat faces are provided on circular discs held in recessed seatings in the shoes, the lower shoe is formed with a peripheral flange having a lower flat abutment face, the outer surface of the upper shoe is threaded, and said shoes are interconnected by a retaining ring having an inturned flange screwed onto the upper shoe until the upper flat face of said inturned flange abuts against said lower abutment face on the lower shoe, the outer diameter of said peripheral flange being less than the inner diameter of the ring to permit the abutment face of the lower shoe to slide relative to the flat face of the inturned flange as the plunger aligns itself in the mould.

3. Apparatus according to claim 2, wherein means are connected to the ram and operable to reciprocate the ram vertically, and a plurality of hollow moulds are arranged to be consecutively presented to the plunger.

4. For use in apparatus for moulding glass articles, comprising a hollow mould and a co-operating plunger mounted on a ram which is operable to move the plunger into and out of the mould, a self-aligning adaptor comprising upper and lower shoes of cylindrical form respectively for fixing to the ram and plunger, each shoe having a seating, two circular discs respectively held one in each of said seatings and having opposed flat faces parallel to a plane transverse to the direction of movement of the ram, a plurality of balls located between said opposed faces to facilitate relative linear movement between the shoes in said transverse plane while maintaining the parallel relationship of the faces, and wherein the lower shoe is formed with a peripheral flange having a lower flat abutment face, the outer surface of the upper shoe is threaded and a retaining ring having an inturned flange is screwed onto the upper shoe until the upper flat face of said inturned flange abuts against said lower abutment face on the lower shoe, the outer diameter of said peripheral flange being less than the inner diameter of the ring to permit the abutment face of the lower shoe to slide relative to the flat face of the inturned flange.

References Cited
UNITED STATES PATENTS

| | | | |
|---|---|---|---|
| 1,529,365 | 3/1925 | Middendorf | 65—308 |
| 3,132,018 | 5/1964 | Prendergast et al. | 65—309 X |
| 3,158,391 | 11/1964 | Carmi et al. | 65—323 X |

DONALL H. SYLVESTER, *Primary Examiner.*

ARTHUR D. KELLOGG, *Assistant Examiner.*

U.S. Cl. X.R.

65—323, 362